United States Patent [19]

Johnson

[11] 4,133,512

[45] Jan. 9, 1979

[54] BUTTERFLY VALVE CONSTRUCTION

[75] Inventor: Jesse R. Johnson, Collins, N.Y.

[73] Assignees: Coyle E. Knowles, Las Vegas, Nev.; Eugene L. Fisher, Gowanda, N.Y.; part interest to each

[21] Appl. No.: 775,517

[22] Filed: Mar. 8, 1977

[51] Int. Cl.² .................................................. F16K 25/00
[52] U.S. Cl. .................................... 251/173; 251/214; 251/308
[58] Field of Search ............... 251/173, 306, 214, 305, 251/307, 308

[56] References Cited

U.S. PATENT DOCUMENTS

| | | | |
|---|---|---|---|
| 2,673,708 | 3/1954 | Danks | 251/173 |
| 2,789,785 | 4/1957 | Woods | 251/306 X |
| 2,893,682 | 7/1959 | Hintzman | 251/173 |
| 2,913,218 | 11/1959 | Broz | 251/173 |
| 3,078,069 | 2/1963 | Broadbent | 251/305 X |
| 3,490,735 | 1/1970 | Nielsen | 251/214 |
| 3,779,512 | 12/1973 | Scaramucci | 251/306 X |
| 3,797,805 | 3/1974 | Nielsen | 251/214 |
| 3,857,406 | 12/1974 | Dorling | 251/306 |
| 4,026,514 | 5/1977 | Summer | 251/173 X |

FOREIGN PATENT DOCUMENTS

| | | | |
|---|---|---|---|
| 191974 | 9/1967 | U.S.S.R. | 251/173 |
| 376620 | 5/1973 | U.S.S.R. | 251/173 |

*Primary Examiner*—Harold W. Weakley
*Attorney, Agent, or Firm*—Joseph P. Gastel

[57] ABSTRACT

A valve comprising a substantially cylindrical housing, a substantially annular cylindrical resilient valve seating member in said housing, said seating member having an inner surface and an outer surface, a butterfly valve having an outer periphery, a shaft extending through the housing and the seating member for mounting the butterfly valve for movement between a first position wherein its outer periphery is in engagement with the inner surface of the seating member and an open position wherein the outer periphery of the valve is spaced from the inner surface, an annular chamber between the outer surface of the valve seating member and the housing, a plurality of apertures in the valve seating member upstream of the butterfly valve for permitting pressurized fluid to enter the chamber to thereby tend to move the resilient valve seating member radially inwardly into engagement with the outer periphery of the butterfly valve when the latter is in a closed position.

6 Claims, 6 Drawing Figures

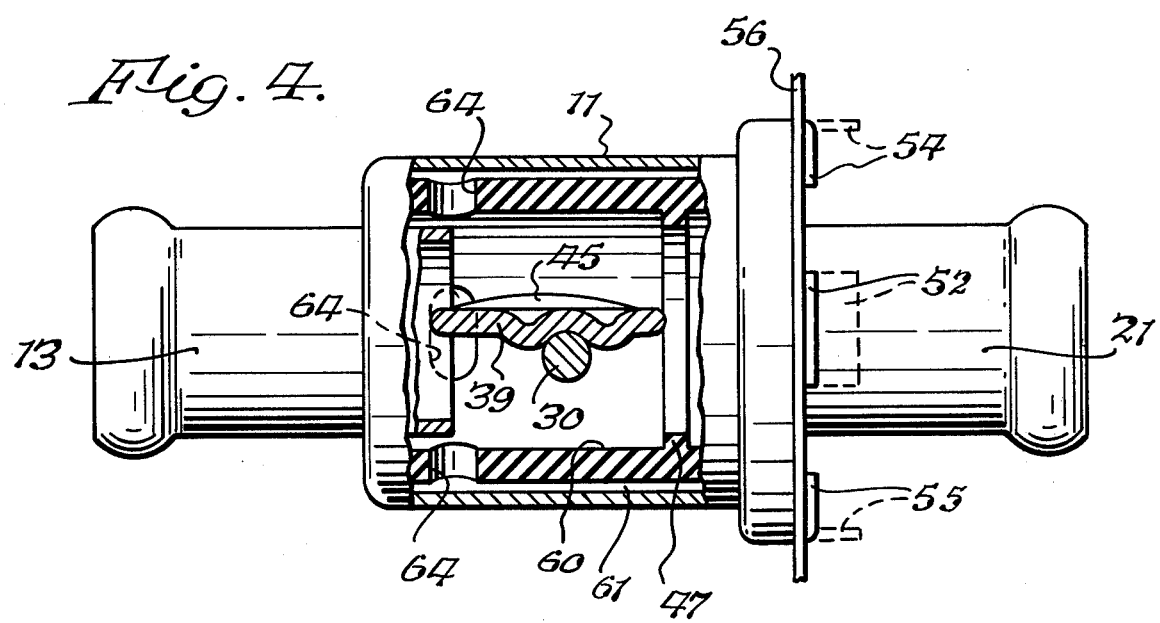
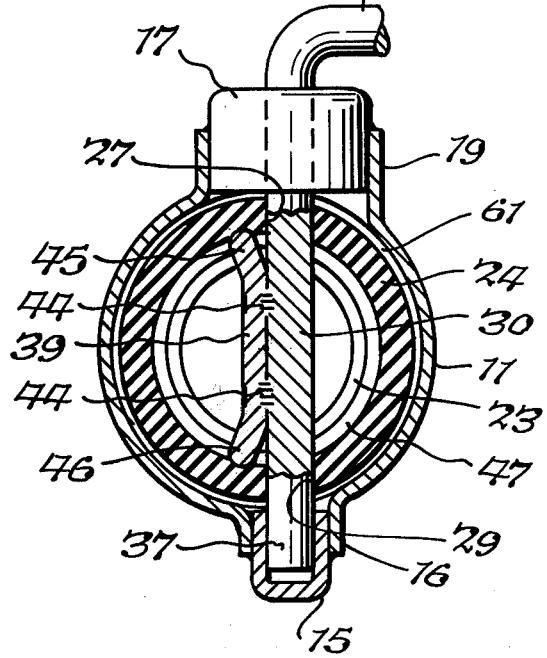
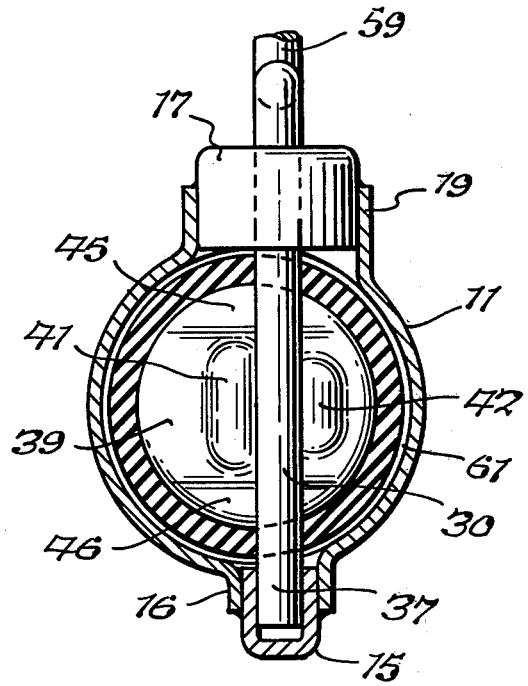

BUTTERFLY VALVE CONSTRUCTION

The present invention relates to an improved butterfly valve construction.

By way of background, providing effective seating in a butterfly valve has always been a problem. On one hand to obtain effective seating, the parts had to be fabricated to a close tolerance, which in turn increased the cost, especially since such close tolerances could only be obtained by machining. In valves which were not machined, that is, valves which were made from drawn parts, there was always a certain amount of leakage. Relative to machined valves, in addition to the drawback of relatively high cost, there was also the drawback that if the parts wore in use, there was no way of effectively compensating therefor.

By way of further background, while there have been teachings in the past of the use of fluid pressure to aid in valve seating, such as shown in prior U.S. Pat. No. 2,973,181, issued to J. R. Johnson and U.S. Pat. Re. 24,102, the valves of such patents were of entirely different construction and mode of operation in that they were not butterfly valves such as shown in the present invention.

It is accordingly one advantage of the present invention that the improved butterfly valve will provide good seating throughout the life of the valve because of an unique seating arrangement contained therein.

It is another advantage of the present invention that the improved butterfly valve can be fabricated out of relatively low cost drawn parts and still provide good seating because of the unique seating arrangement contained therein. Other advantages of the present invention will readily be perceived hereafter.

The present invention relates to a valve construction comprising a housing, a butterfly valve in said housing, a peripheral portion on said butterfly valve, a seating surface on the inside of said housing for seating engagement by said peripheral portion, and means for biasing said seating surface toward said peripheral portion when said peripheral portion is in engagement therewith.

In accordance with a preferred embodiment of the present invention, the means for biasing the seating surface toward the peripheral portion comprises a chamber for receiving pressurized fluid for causing the seating surface to be biased toward the peripheral portion of the valve in seating engagement therewith. The various aspects of the present invention will be more fully understood when the following portions of the specification are read in conjunction with the accompanying drawings wherein:

FIG. 4 is a fragmentary view which is similar to FIG. 3 but showing only the central portion of the valve in cross section and showing the butterfly valve in an open position;

FIG. 5 is a fragmentary cross sectional view taken substantially along line 5—5 of FIG. 2 and showing the valve in a closed position; and FIG. 6 is a view similar to FIG. 5 but showing the valve in an open position.

Figure 1:
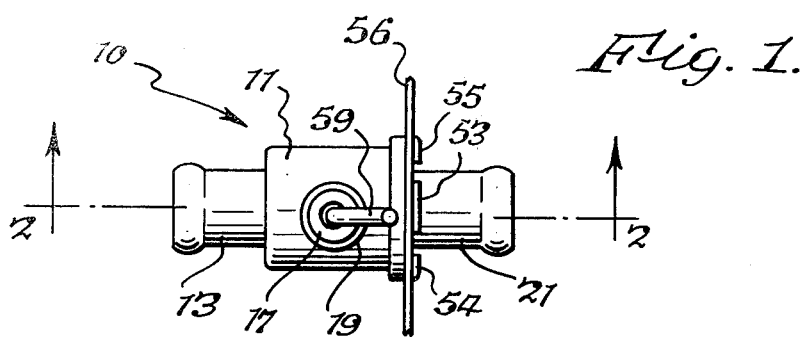
FIG. 1 is a plan view of the improved valve of the present invention.

The improved valve 10 includes a generally cylindrical central housing portion 11 having an inwardly bent annular flange 12 to which inlet conduit 13 is copper-brazed in fluid-tight relationship. A cylindrical cup-like bearing 15 is received in the aperture defined by annular flange 16 which is a part of central housing 11 and the joint therebetween is copper-brazed. A cylindrical shaft-seal housing 17 is received within annular flange 19 formed integrally with central housing portion 11 and the joint therebetween is copper-brazed. After the foregoing subassembly consisting of parts 11, 13, 15 and 17 have been fabricated, they are zinc plated, or otherwise coated for corrosion resistance, as desired.

A second subassembly consisting of annular housing member 20 and outlet conduit 21 is also provided. The cylindrical portion 22 of housing member 20 has portion 23 of conduit 21 copper-brazed thereto. After the foregoing subassembly has been fabricated, it is zinc plated.

A generally cylindrical seating member 24, which is fabricated of rubber or other flexible resilient material is inserted within housing 11. The inlet end portion 25 receives the annular flange 12 of housing 11 and is contained within the annular trough 26 at the left end of housing 11. Seating member 24 includes first and second apertures 27 and 29 which receive shaft 30. In this respect, an O-ring 31 is placed in recess 32 of bearing housing 17 and a washer 33 is inserted thereover, after which flange 35 is swaged to retain the parts assembled. Thereafter, shaft 30 is inserted through washer 33, O-ring 31, aperture 36 in bearing housing 17, aperture 27, aperture 29, and the end 37 of shaft 30 is received in bearing 15.

After shaft 30 has been positioned in the foregoing manner, it is rotated until it occupies the position which it would occupy when the valve is closed. Thereafter, the butterfly valve 39 is inserted through the outlet end 40 of seating member 24, inasmuch as at this time, the subassembly consisting of parts 20 and 21 have not yet been mounted on the central housing portion 11. Disc or butterfly member 39 is of generally circular shape and central portions thereof are upset at 41 and 42 to provide a concave portion at 43 which receives shaft 30 in complementary mating relationship. After butterfly valve 39 has been positioned so that it receives shaft 30 at concavity 43, it is spot-welded to the shaft, for example, at locations 44. It is to be noted that the portions 45 and 46 of disc 39, which are proximate apertures 27 and 29, respectively, of seating member 24, are bent outwardly away from such apertures so as to prevent leakage past these portions of the valve because of their proximity to apertures 27 and 29.

Figure 2:
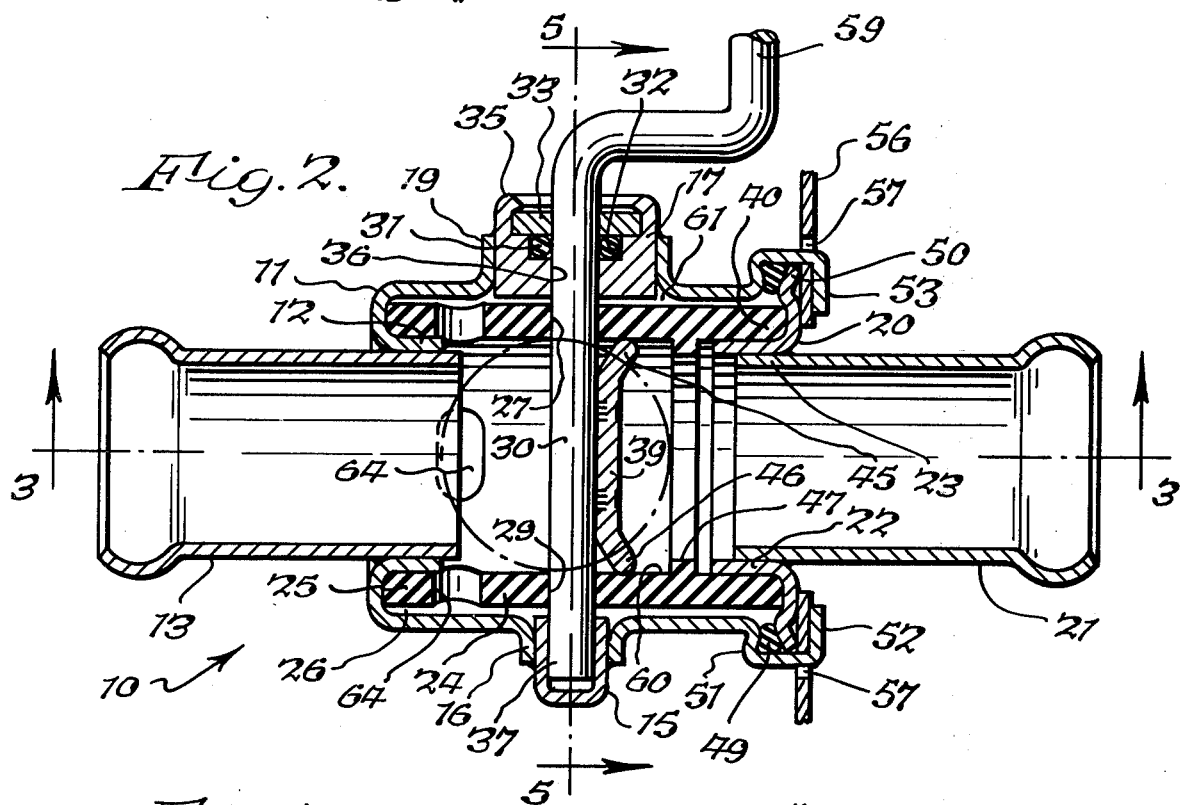
FIG. 2 is a fragmentary cross sectional view taken substantially along line 2—2 of FIG. 1.

After valve 39 has been welded to shaft 30, the subassembly consisting of parts 20–21 is secured to central valve housing 11. In this respect, a mandrel (not shown) is inserted through outlet conduit 21 and the end of the mandrel is inserted into seating member 24 and is thereafter expanded so as to engage the side of annular internal rib 47 facing valve 39 to prevent the seating member 24 from being pushed to the left in FIG. 2 when the cylindrical portion 22 of member 20 is inserted into end portion 40 of seating member 24 in fluid-tight sealing relationship. After member 20 has been positioned as shown in FIG. 2, with an O-ring 49 compressed in fluid-tight relationship between annular rim 50 of part 20 and annular shoulder 51 of housing 11, four tabs 52, 53, 54 and 55, which are extensions of central housing 11 and which previously occupied a dotted line position, such as shown in FIG. 4, are bent to the solid line position shown in FIGS. 2 and 4 to hold housing portion 20 in fluid-tight relationship relative to central housing portion 11 with O-ring 49 therebetween. However, prior to the time that tabs 52, 53, 54 and 55 are bent, a mounting plate 56 is positioned as shown in FIG. 2 and the tabs extend through suitable apertures such as 57 in the mounting plate. The mounting plate 56 is for the purpose of mounting a fluid motor or the like, the output shaft of which is suitably connected to the external portion 59 of shaft 30 for actuating the latter.

In use, liquid under pressure enters inlet conduit 13. When the butterfly or disc 39 is in an open position (FIGS. 4 and 6), liquid will flow through the valve and out through outlet conduit 21. There will be no leakage because of the various copper brazed joints and seals at the appropriate places, as described in detail above. When it is desired to close the valve, shaft 30 is rotated to cause disc 39 to assume the positions shown in FIGS. 2, 3 and 5. Under such circumstances the outer periphery of disc 39 will be in engagement with the inner surface 60 of seating member 24. Pressurized liquid in inlet conduit 13 and in seating member 24 will enter annular chamber 61 which is located between the outer surface 62 of seating member 24 and the inner surface 63 of central housing 11. The pressurized fluid enters chamber 61 through four apertures 64 in seating member 24 and is retained therein because the end 40 of the seating member is mounted in fluid-tight relationship on cylindrical portion 22. The pressurized liquid in chamber 61 biases flexible resilient seating member 24 radially inwardly to the right of centerline 65 (FIG. 3) because the inner surface 60 to the right of centerline 65 is a lower pressure area. The inward movement of seating member 24 will thus provide a good seal with the outer peripheral portion of disc 39 to prevent leakage, even though the member 24 might be worn from use or might not otherwise mate perfectly with the periphery of valve 39 in its unbiased condition.

Figure 3:
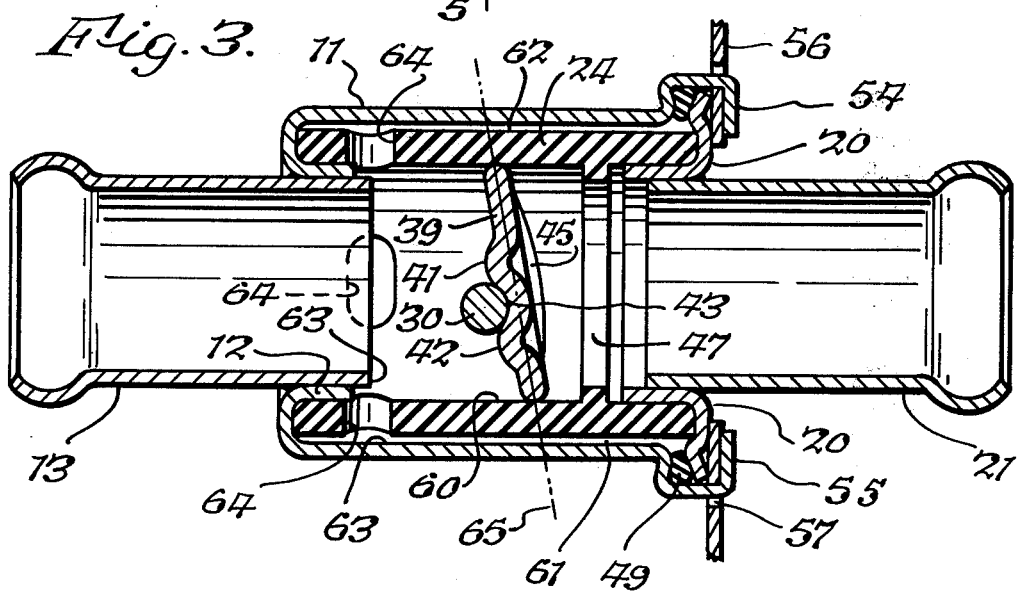
FIG. 3 is a fragmentary cross sectional view taken substantially along line 3—3 of FIG. 2 and showing the butterfly valve in a closed position.

As can be noted from FIG. 3, there is more of disc 39 to one side of shaft 30 than to the other side. Therefore, high pressure liquid pressing against this larger side will tend to keep disc 39 in a closed position. However, it is to be noted that shaft 30 is offset from the axis of seating member 24 (FIG. 3) and therefore when disc 39 is in an open position (FIG. 4) it will lie essentially on such axis of seating member 24 so that there will be no biasing force tending to close it. Furthermore, the open position tends to be maintained because of an interference fit between the outer periphery at portions 45 and 46 of disc 39 and seating member 24, as can be seen from FIG. 6. In addition to the foregoing, it is to be noted that end 63 of inlet conduit 13 extends to a point at about the midpoint of apertures 64 so that the force of the incoming liquid tends to carry sedimentary materials and impurities beyond apertures 64, to thereby minimize the tendency for them to become clogged.

It will be appreciated that under certain circumstances, namely, lower pressure applications, it may be desired to eliminate chamber 61, in which event the effectiveness of the seating between valve 39 and inside surface 60 would depend to a great extent on the resilience of seating member 24. A construction without chamber 61 is within the scope of the present invention. However, it will be appreciated that for high pressure applications, annular chamber 61 is needed because otherwise the high pressure in the inlet portion of member 24 could force it away from seating engagement with valve 39.

While the foregoing portions of the specification have specifically referred to copper-brazing, it will be understood that any other suitable means of attachment may be used. In addition, any other types of sealing means can be substituted for O-rings 31 and 49, if desired.

It can thus be seen that the improved valve of the present invention is manifestly capable of achieving the above enumerated objectives and while a preferred embodiment has been disclosed, it will be appreciated that it is not limited thereto but may be otherwise embodied within the scope of the following claims.

What is claimed is:

1. A valve construction comprising a housing, a substantially cylindrical flexible seating member having an inside portion and an outside portion within said housing, inlet and outlet portions on said seating member, first and second spaced apertures in said seating member, a shaft extending through said first and second spaced apertures, a disc mounted on the portion of said shaft between said first and second apertures for movement between a closed position wherein it is in engagement with said inside portion and an open position wherein it is spaced from said inside portion, a chamber between said outside portion and said housing, sealing means for effecting a sealing relationship between said outlet portion and said housing whereby said chamber is in fluid-tight relationship with said seating member at said outlet portion, opening means for effecting communication between the inside of said inlet portion of said seating member and said chamber, whereby pressurized fluid can enter said chamber, said chamber extending beyond said disc member toward said outlet portion to thereby provide an inwardly directed force on said outside of said tubular member in the area of said outlet portion to force the inside of said tubular member into seating engagement with said disc when said disc is in said closed position, said shaft extending beyond said first and second apertures in said seating member, first bearing means on said housing for supporting a portion of said shaft proximate said first aperture, second bearing means on said housing for supporting a portion of said shaft proximate said second aperture, an inlet conduit comprising a conduit separate from said housing and in communication with said housing, and a fluid-tight joint between said housing and said inlet conduit, said inlet conduit having an inner end portion within said housing, said inlet portion of said seating member including an end portion located upstream of said inner end portion of said conduit, and said inner end portion of said inlet conduit extending downstream beyond said opening means and being spaced radially inwardly from said opening means so as to tend to direct the main stream of fluid flow beyond said opening means.

2. A valve construction as set forth in claim 1 wherein said opening means comprise apertures in said inlet portion of said seating member.

3. A valve construction as set forth in claim 1 wherein said housing is of generally cylindrical shape, third and fourth apertures in said housing in alignment with said first and second apertures, said shaft having first and second end portions and extending through said third and fourth apertures, respectively, said first bearing means comprising a housing separate from said housing and affixed to said housing in alignment with said third aperture to receive said first end portion of said shaft, an O-ring in said bearing housing surrounding said first end portion of said shaft to effect a fluid-tight seal therewith, a washer mounted on said first end portion of said shaft for holding said O-ring in said bearing housing, and means on said bearing housing for retaining said washer in position therein.

4. A valve construction as set forth in claim 3 wherein said second bearing means include a cup member mounted on said housing in sealing relationship with said fourth aperture proximate said second end portion of said shaft.

5. A valve construction as set forth in claim 4 wherein said fourth aperture is defined by an annular flange formed integrally with said housing, and wherein said cup member and said flange are positioned in mating relationship.

6. A valve construction as set forth in claim 1 wherein said shaft is laterally offset from and transverse to the longitudinal axis of said seating member.

* * * * *